Dec. 27, 1932.  A. C. RICHMOND  1,892,005
GAUGE
Filed Dec. 15, 1930

Inventor:
Albert C. Richmond
By N. P. Doolittle,
Atty.

Patented Dec. 27, 1932

1,892,005

UNITED STATES PATENT OFFICE

ALBERT C. RICHMOND, OF LA GRANGE, ILLINOIS, ASSIGNOR TO INTERNATIONAL HARVESTER COMPANY, A CORPORATION OF NEW JERSEY

GAUGE

Application filed December 15, 1930. Serial No. 502,281.

This invention relates to a gauge structure for gauging the thickness of sheet metal parts.

The principal object is to provide a direct reading instrument for gauging the thickness of sheet metal between ball points.

Briefly, this object is accomplished in a gauge structure embodying a block provided with a horizontal passage-way, which passage-way is obstructed by two superimposed balls in such a manner that the strip of metal to be gauged is passed between the balls, whereby one of the balls, which is weighted to cause the same closely to contact the metal to gauged, is movable bodily in a vertical direction to move the operating member of a dial gauge In this manner, a direct reading giving the thickness of the strip of metal can be had.

In the accompanying sheet of drawing illustrating this invention,—

Figure 1:
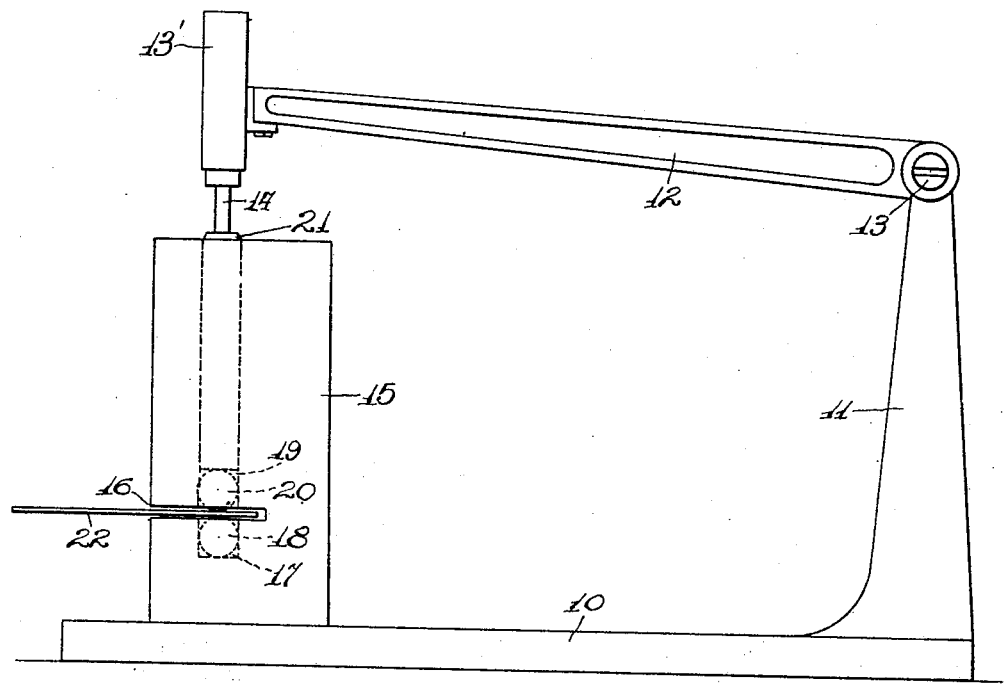
Figure 1 is a side elevational view of the gauge.
Figure 2:
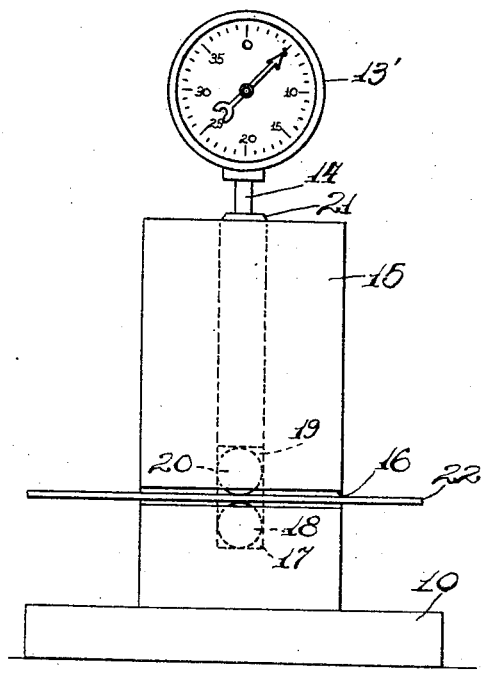
Figure 2 is an end view of the gauge.

The structure includes a base 10 and a standard 11, which standard 11 carries a beam 12 connected to the standard 11 by a screw 13. The free end of the beam 12 carries a conventional form of dial gauge 13', which has an operating member 14. The beam 12 can be adjustably set up or down by means of screw 13.

Carried by the base 10 is a block 15 formed with a horizontal passage-way 16. Beneath the passageway 16 the block is formed with a pocket 17, in which is arranged a ball 18 that projects upwardly into the passage-way 16. In vertical alignment with the pocket 17 the upper portion of the block 15 is formed with a vertical bore 19, into which is dropped a ball 20, that also extends into the passage-way 16 and, in fact, normally rests on the ball 18. A weighted plunger 21 is loosely arranged in the passage-way 19 and rests freely directly on the ball 20. A strip of metal to be gauged is shown at 22.

In use, the ribbon of metal 22 is passed into the passage-way 16, which forces the ball 20 upwardly off the ball 18. The weight 21 insures then that the ball 20 will closely contact the work 22 to insure greater accuracy in the gauging operation. The weight 21 will then rise and fall with the ball 20 in accordance with irregularities in thickness of the strip 22, which motion is communicated to the operating member 14 for the gauge 13', whereby the indicator needle of the gauge gives a reading in a manner that will be well understood.

From this disclosure it must now be apparent that an improved gauge has been provided, which achieves the objects heretofore recited, and that the same is simple in construction and not likely to get out of order in use.

It is the intention to cover herein all changes and modifications which do not depart from the spirit and scope of this invention as set forth in the following claims.

What is claimed is:

1. In a thickness gauge for flat strips, said gauge comprising a vertically disposed block having a horizontal passage-way formed therethrough, a pocket formed in the block below the passageway, a ball seated loosely in the pocket, said ball projecting slightly into the passage-way, a vertical bore formed in the block above the pocket, a second ball located in said bore and normally resting on the first mentioned ball, whereby the strip to be gauged may be passed between the balls, a weight slidably arranged in the vertical bore and resting on the upper ball, an indicator gauge carried above the block, and gauge operating means contacting the weight.

2. In a thickness gauge for flat strips, said gauge comprising a vertically disposed block having a horizontal passage-way formed therethrough, a pocket formed in the block below the passage-way, a ball seated loosely in the pocket, said ball projecting slightly into the passageway, a vertical bore formed in the block above the pocket, a second ball located in said bore and normally resting on the first mentioned ball, whereby the strip to be gauged may be passed between the balls, a weight slidably arranged in the vertical bore and resting on the upper ball, a standard adjacent the block, a beam carried by the standard, an indicator gauge carried by the beam above said block, and gauge operating means contacting the weight.

In testimony whereof I affix my signature.

ALBERT C. RICHMOND.